(12) United States Patent
Tsurumaki (10) Patent No.: US 6,441,984 B1
(45) Date of Patent: Aug. 27, 2002

(54) CASSETTE AUTO-CHANGER WITH CASSETTE ACCOMMODATING PORTION PROVIDING CASSETTE RECORDING FORMAT INFORMATION

(75) Inventor: Nobuhiro Tsurumaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1088 days.

(21) Appl. No.: 08/911,442

(22) Filed: Aug. 12, 1997

Related U.S. Application Data (63) Continuation of application No. 08/552,170, filed on Nov. 2, 1995, now abandoned, which is a continuation of application No. 08/149,618, filed on Nov. 9, 1993, now abandoned.

(30) Foreign Application Priority Data

Nov. 10, 1992 (JP) .............................................. 4-324895

(51) Int. Cl.[7] .............................................. G11B 17/00
(52) U.S. Cl. .............................. 360/69; 360/92; 360/94
(58) Field of Search .............................. 360/69, 71, 92, 360/94, 98.01, 93.04, 13, 15; 369/34, 85, 75.1

(56) References Cited

U.S. PATENT DOCUMENTS

| 4,527,262 | A | * | 7/1985 | Manto .......................... 369/33 |
| 4,937,690 | A | * | 6/1990 | Yamashita et al. ........ 360/94 X |
| 5,303,214 | A | * | 4/1994 | Kulakowski et al. 360/98.04 X |
| 5,450,254 | A | * | 9/1995 | Sato et al. ................ 360/92 X |
| 5,528,747 | A | * | 6/1996 | Yumine et al. ........... 360/69 X |

* cited by examiner

Primary Examiner—Andrew L. Sniezek
(74) Attorney, Agent, or Firm—Frommer Lawrence & Haug LLP; William S. Frommer; Gordon Kessler (57) ABSTRACT

A cassette auto-changer includes a cassette accommodating portion, a plurality of recording and/or reproducing units, a cassette transport mechanism and a controller. The cassette accommodating portion stores assigned recording format information for the cassettes which can be accommodated therein, and includes gates for reading the stored format information and supplying the format information to the controller in response to a read signal from the controller. The cassette accommodating portion also senses the size of the cassettes accommodated therein.

10 Claims, 9 Drawing Sheets

CASSETTE AUTO-CHANGER WITH CASSETTE ACCOMMODATING PORTION PROVIDING CASSETTE RECORDING FORMAT INFORMATION

This application is a continuation-in-part, continuation division of application Ser. No. 08/552,170, filed Nov. 2, 1995 ABN.

This application is a continuation-in-part, continuation division of application Ser. No. 08/149,618, filed Nov. 9, 1993.

BACKGROUND OF THE INVENTION

1. Field of the Invention

This invention relates to a cassette auto-changer which selectively takes out a cassette from an accommodating portion accommodating a plurality of cassettes having tape recording mediums or disc recording mediums respectively, to load into a predetermined recording and/or reproducing means, and then records an information on the tape recording medium or the disc recording medium housed in the cassette, or reproduces an information from the tape recording medium or disc recording medium, in order to successively record and/or reproduce for a long time, and more particularly to an improvement of a cassette auto-changer loaded cassettes having various recording formats.

2. Description of the Related Art

Heretofore, a cassette auto-changer of the foregoing type has been proposed by this applicant, for example, in the U.S. patent application Ser. No. 07/971,070, in which a shelf device having a plurality of accommodating portions accommodating a plurality of cassettes housing magnetic tapes respectively as a recording medium (hereinafter called "bin") is provided. The cassette accommodated into each bin is selectively taken out at need, to convey and load it into a predetermined video tape recorder (VTR) by a conveyance means (elevator), in order to record and/or reproduce a predetermined information (video signal etc.) from a magnetic tape housed in the cassette. The cassette auto-changer of the foregoing type can load plural kinds of cassettes having different recording formats or different sizes.

Additionally, the conventional cassette auto-changer has a switcher for switching the connections of a plurality of input lines and output lines. As a result, it is possible to output a plurality of output signals from a plurality of VTRs through corresponding output channels according to the connection condition of the switcher, as well as input video signal obtained from the outside video source into the corresponding VTRs through input channels allocated respectively.

In such a configuration of cassette auto-changer, a conveyance command of the cassette is input from a predetermined cassette conveyance control device, to send and receive thus selected cassette between a bin and a VTR. Further, when the user designates a predetermined command to a VTR control portion separated this, the VTR is controlled in recording state, reproducing state etc. Further, when controlling the switcher, it has been adapted to switch the connection of input and output channel of the switcher by a switcher control means.

In the cassette auto-changer having such structure, every unit containing plural bins accommodates cassettes having predetermined recording format. That is, each unit is adapted to accommodate the cassettes having different recording formats.

The cassettes having various recording formats have difference sizes and each unit accommodates cassettes having various sizes and the same format.

The cassette of the first recording format has three kinds of different lengths and widths (hereinafter, the largest cassette is called "L cassette", the intermediate size cassette is called "M cassette", and the smallest cassette is called "S cassette"). These cassettes have the same thickness (¾ inches).

Other cassette of the second recording format has two kinds of different lengths and widths (hereinafter, large cassette is called "L cassette" and small cassette is called "S cassette") and of the same thickness (½ inches).

Still other cassette of the third recording format has one kind of a thickness ½ inches (hereinafter, it is called "S cassette").

In the cassettes of the first, the second, and the third recording formats, if they are the same in type, i.e. L cassettes or S cassettes, but they are different in size.

On the contrary, in a cassette auto-changer loaded together with plural kinds of cassettes having different recording formats, there are plural kinds of cassettes, bins, and VTRs without exchangeability each other. In such a case, if the control portion for controlling the cassette auto-changer is not recognized that each cassette, bin, and VTR are corresponding in recording format, there is able to arise a trouble that a cassette of one recording format is inserted into a bin of different recording format.

Accordingly, when cassettes having different recording formats are accommodated separately every unit, it is necessary that the control portion of the cassette auto-changer previously recognizes units allocated by types of the cassettes. By recognizing the recording format of the cassette in the control portion, it is considered that the cassettes of respective recording formats are certainly accommodated into corresponding cassette accommodating portions.

Here, a recognizing method of different recording format has been proposed by this applicant, in the U.S. patent application Ser. No. 07/971,070. A type detecting board showing a recording format is provided every accommodating portion accommodating cassettes of respective recording formats. According to the detected result whereby a type detecting sensor composed of a photo-coupler provided to a conveyance device detects the type detecting board, the conveyance device moves to detect the recording format of the cassette accommodated into respective accommodating units. However, in such a method, there has been problems that it has been needed parts for identifying kinds of cassettes, such as type detecting boards, type detecting sensors or the like, which must be provided every unit, and it has been needed troublesome works that the conveyance device has to be previously moved to detect the recording formats every accommodating unit.

SUMMARY OF THE INVENTION

In view of the foregoing, an object of this invention is to provide a cassette auto-changer in which cassette accommodating portions (bins and accommodating units) allocated every different recording format can be discriminated certainly and easily.

The foregoing object and other objects of this invention have been achieved by the provision of a cassette auto-changer, comprising: cassette accommodating shelves having a plurality of cassette bins accommodating plural kinds of cassettes with different types of recording media recording formats of which are different each other; a plurality of recording and/or reproducing portions for selectively recording and/or reproducing a format signal in accordance with the recording formats of the recording media on/from the recording media accommodated in one of said plurality of types of cassettes loaded therein; a cassette conveyance portion for selectively conveying the plural kinds of cassettes between the plurality of cassette bins and the plurality of recording and/or reproducing portions, and loading the plurality of cassettes into the plurality of cassette bins and the plurality of recording and/or reproducing portions; means for storing information indicative of type of recording format of recording media housed in the plural kinds of cassettes accommodated within the plurality of cassette bins; information storing means connected to the storing means to read said information indicative of type of recording formats from the storing means; information reading means connected to the reading means to discriminate said recording formats of recording media housed in the plurality of kinds of cassettes accommodated in the plurality of cassette bins in response to the information indicative of type of recording formats read by the reading means, wherein: the plural kinds of cassettes. with different recording formats are accommodated in an accommodating unit consisting of a plurality of cassette bins every type of recording formats; the storing means are provided to each accommodating unit.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
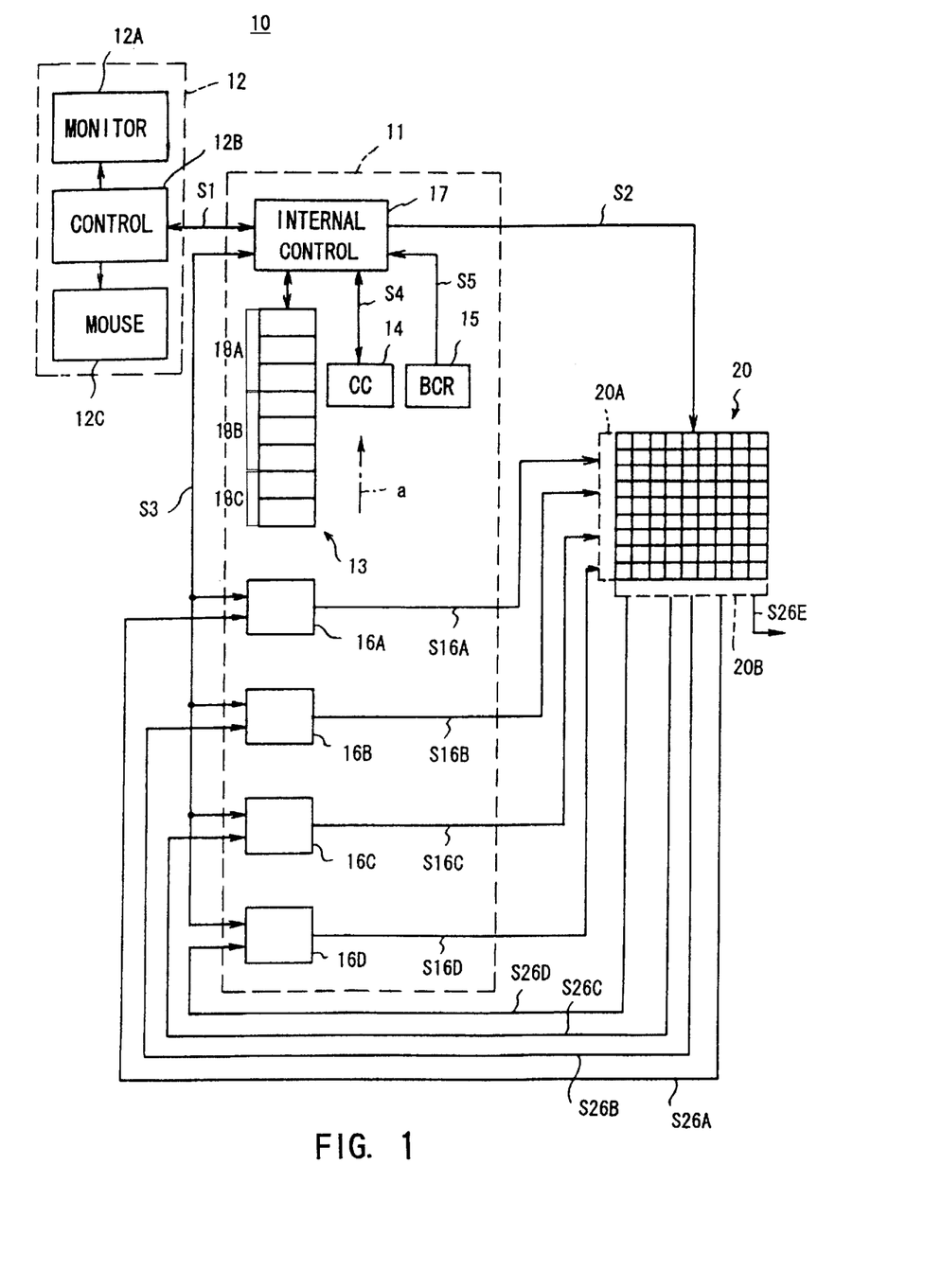
FIG. 1 is a block diagram showing an embodiment of the cassette auto-changer of this invention.

Preferred embodiments of this invention will be described with reference to the accompanying drawings:

In FIGS. 1, 10 shows generally the cassette auto-changer composed of a cassette auto-changer main portion 11, a switcher 20, and an external control apparatus 12.

The cassette auto-changer main portion 11 inputs a control signal S1 output from the control portion 12B of the external control apparatus 12 into an internal control portion 17 in order to control a cassette conveyance device 14, VTRs 16A to 16D and the switcher 20 on the basis of the control signal S1.

In other words, when the internal control portion 17 is instructed to convey a cassette housing a recording medium by a control signal S1, the internal control portion 17 sends a conveyance command signal S4 to the cassette conveyance device 14, so that the cassette conveyance device 14 moves in "a" direction shown by an arrow or the opposite direction resulting in a sending and receiving of the cassettes between the VTRs 16A to 16D and the cassette accommodating portion 13 accommodating plural cassettes.

The cassette accommodating portion 13 has a several layers of bins (shelves) accommodating cassettes. Each bin can accommodate three kinds of cassettes having different sizes. That is, each bin can accommodate the smallest cassettes two by two at the left and the right. Further, each bin can accommodate the intermediate cassette and the largest cassette one by one.

In addition, an unit 18A of plural bins is formed to accommodate cassettes of the same recording format in such unit. Units 18B and 18C are also formed to accommodate cassettes of the same recording format.

A predetermined cassette is taken out of the cassette accommodating portion 13 containing various cassettes of different sizes and different recording formats by means of the conveyance device 14, the predetermined cassette is conveyed to and loaded into anyone of the VTRs 16A to 16D corresponding to the recording format, and the cassette accommodated in the cassette accommodating portion 13 can be selectively loaded to VTRs 16A to 16D at need.

A bar code reading apparatus 15 is provided near the cassette holding portion of the cassette conveyance device 14. The bar code reading device 15 reads the bar code attached to the cassette to be conveyed by the cassette conveyance device 14 and sends read out signal S5 to the internal control portion 17 in order to recognize an identification data (ID) of the conveyed cassette.

When control signal S1 output from the external control apparatus 12 instructs to control the VTRs 16A to 16D, the internal control portion 17 sends VTR control signal S3 to corresponding VTRs 16A to 16D so as to function them operating recording, reproducing, fast forwarding, rewinding, and head searching, etc. As a result, VTRs 16A to 16D execute recording or reproducing the information in the cassette conveyed from the cassette accommodating portion 13 and loaded into the VTRs.

When a command for switching the connection of the input and output lines of the switcher 20 by means of control signal S1 output from the external control apparatus 12 is input to the internal control portion 17, the internal control portion 17 outputs switcher control signal S2 for switching the connection condition of the switcher 20.

That is, the switcher 20 has an input-bus 20A of input lines of twelve channels and an output-bus 20B consisting of output lines of twelve channels. Switching the connection of the input lines and the output lines by switcher control signal S2 of the internal control portion 17 outputs the signals input into respective lines of the input-bus 20A from the output lines of corresponding output-bus 20B.

Consequently, output signals S16A to S16D output from the VTRs 16A to 16D are input into the input channels of the input-bus 20A of the switcher 20, as well as signals S26A to S26D output from the output channels of the output-bus 20B are input into the VTRs 16A to 16D.

Figure 2:
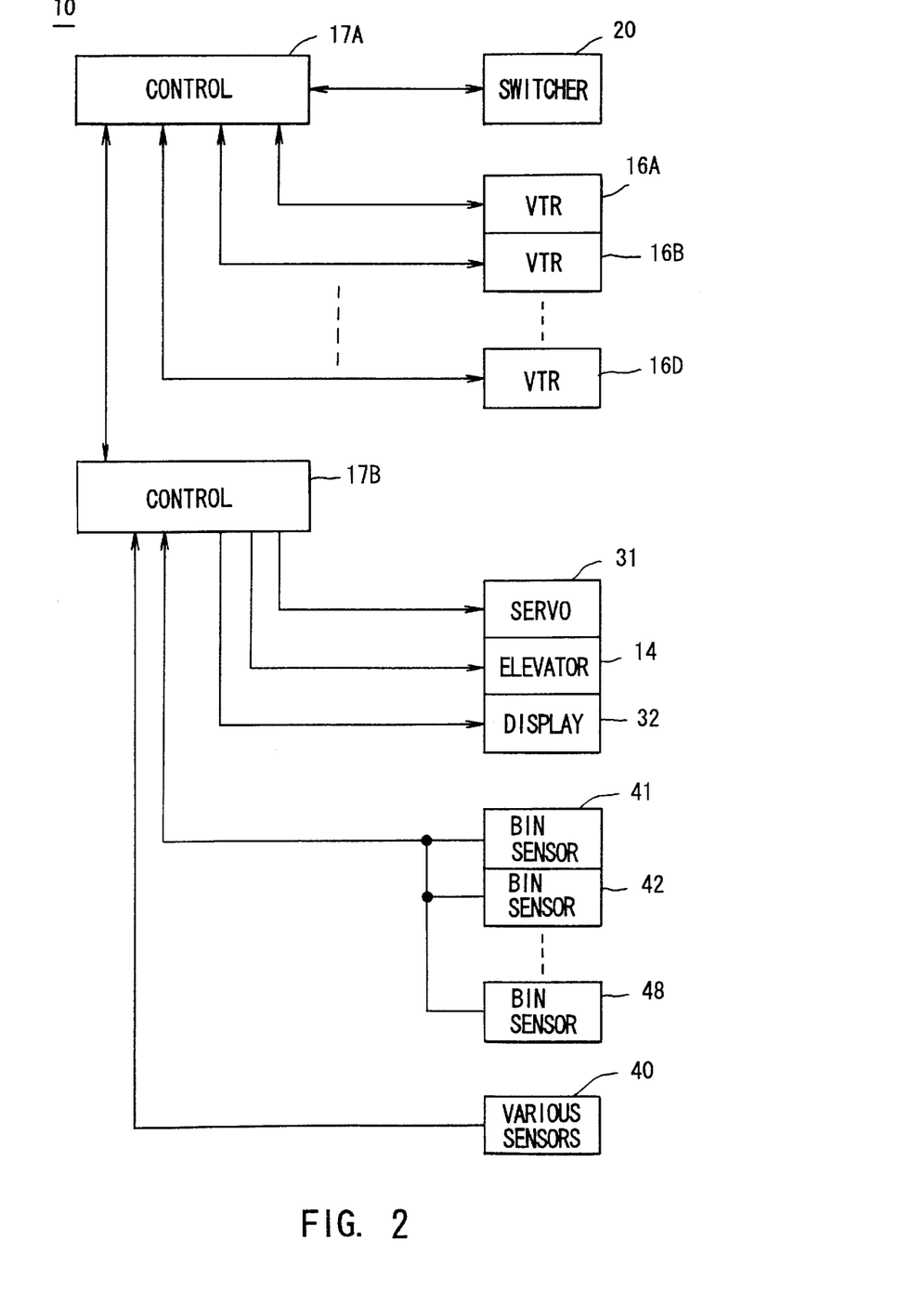
FIG. 2 is a block diagram showing a control system of the cassette auto-changer.

As shown in FIG. 2, the first control circuit 17A of the internal control portion 17 of the cassette auto-changer 10 of this invention is adapted to control the switcher 20 and the VTRs 16A to 16D, as well as the second control circuit 17B controls a servo system 31, an elevator (cassette conveying apparatus 14), and a display 32, and similarly bin sensors 41 to 48 provided in respective bins and various sensors 40.

Figure 3:
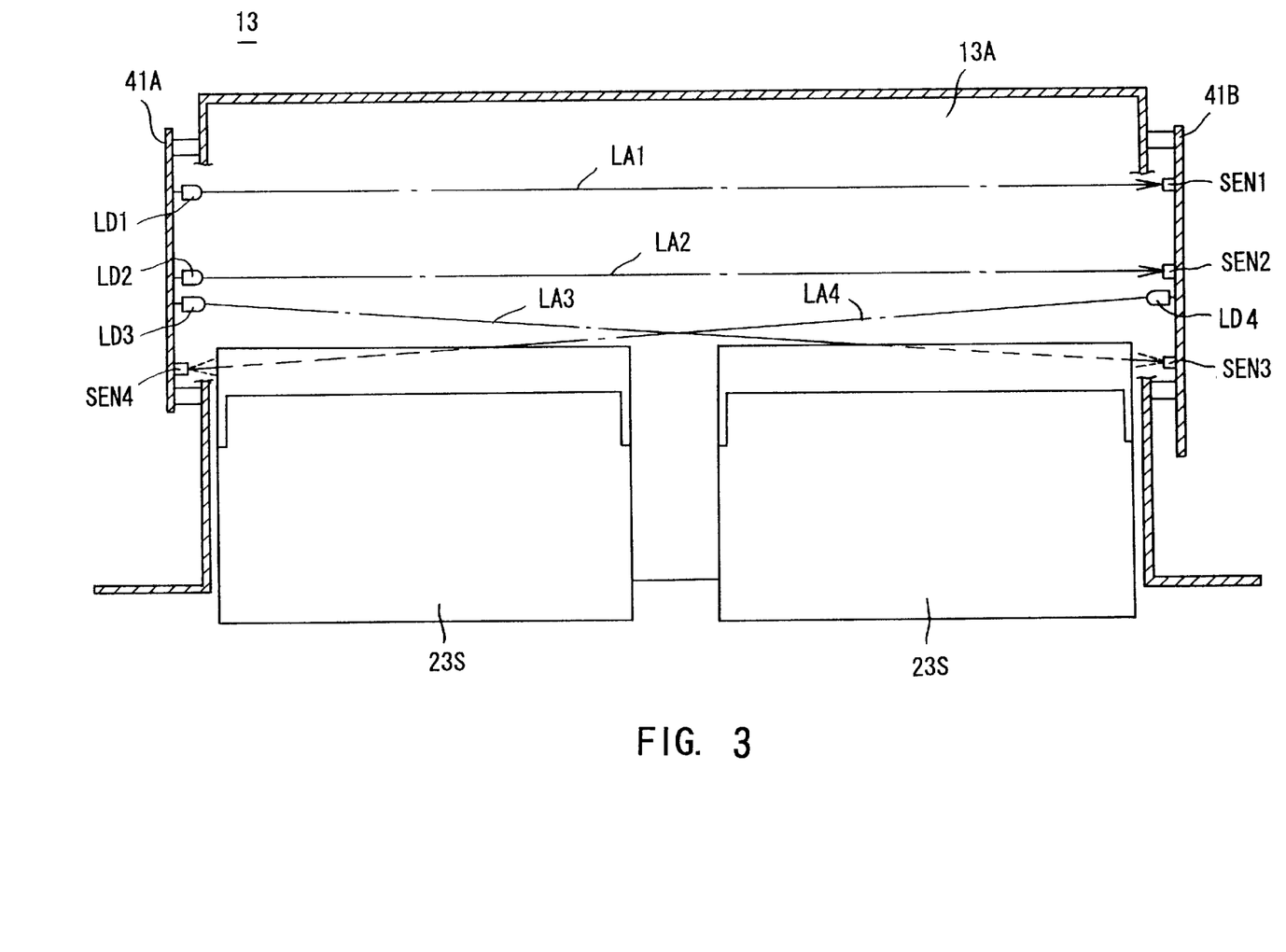
FIG. 3 is a plane view showing detection condition of S cassette by a bin sensor.

Additionally, as shown in FIG. 3, respective bins 13A of the cassette accommodating portion 13 have first and second detection board 41A and 41B, respectively formed on the opposing side faces of the bin 13A. The first detection board 41A has a light emitting portions LD1, LD2, and LD3 and a light receiving portion SEN4. The detection board 41B has a light emitting portion LD4 and light receiving portions SEN1, SEN2, and SEN3.

Light from the light emitting portion LD1 is received by the light receiving portion SEN1, light from the emitting portion LD2 is received by the light receiving portion SEN2, light from the emitting portion LD3 is received by the light receiving portion SEN3, and light from the light emitting portion LD4 is received by the light receiving portion SEN4.

When the smallest cassette (hereinafter it is called "S cassette") 23S is accommodated at the right side in FIG. 3, light beam from the light emitting portion LD3 is blocked by the accommodated S cassette 23S, and the control apparatus 17B detects that the S cassette 23S is accommodated at the right side.

When the smallest cassette (hereinafter it is called "S cassette") 23S is accommodated at the left side in FIG. 3, light beam from the light emitting portion LD4 is blocked by the accommodated S cassette 23S, and the control apparatus 17B detects that the S cassette 23S is accommodated at the left side.

Figure 4:
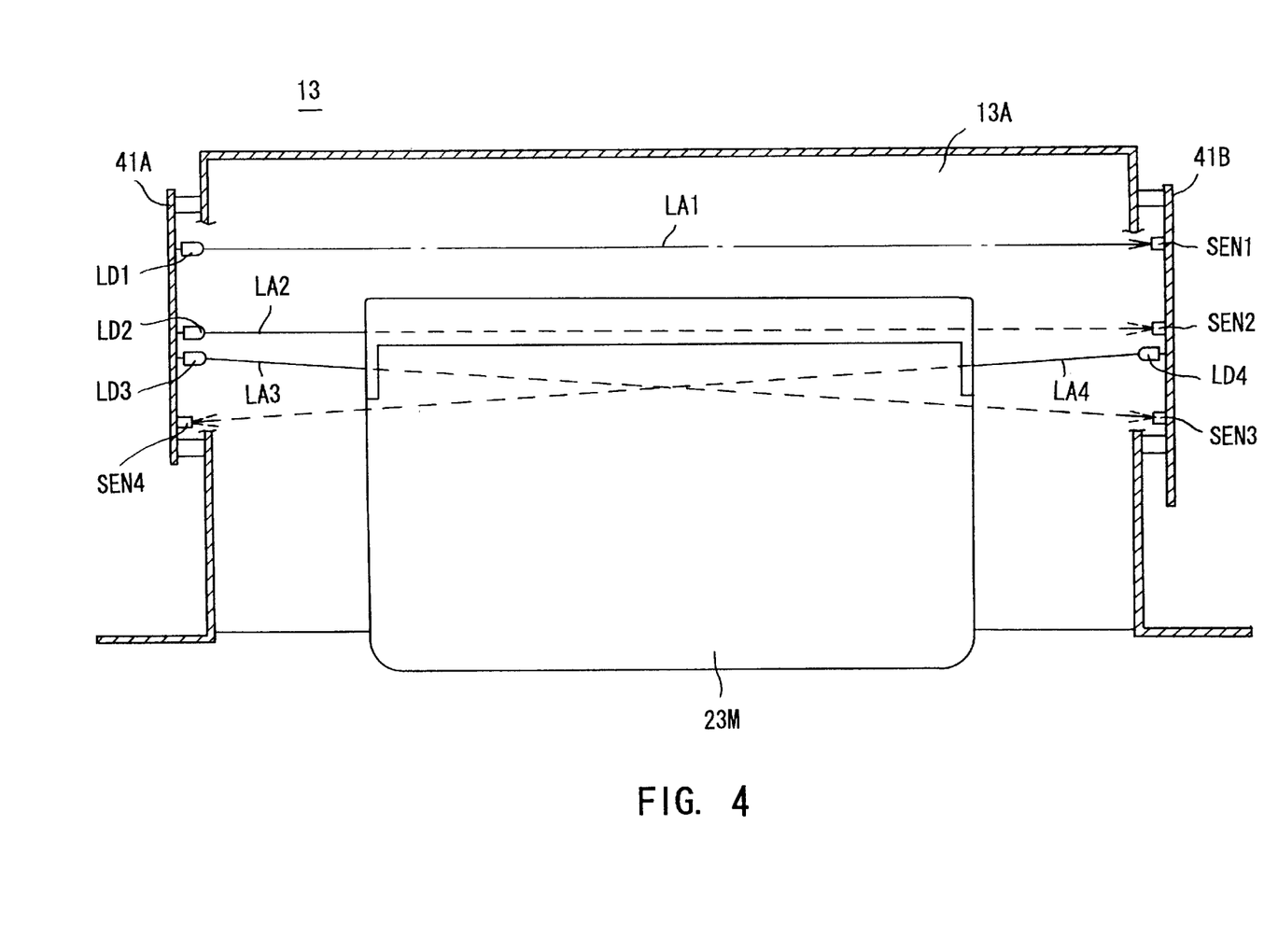
FIG. 4 is a plane view showing detection condition of M cassette by a bin sensor.

On the contrary, as shown in FIG. 4, when the intermediate cassette (hereinafter called "M cassette") 23M is accommodated, light beams from the light emitting portions LD2, LD3, and LD4 are blocked by the accommodated M cassette 23M, and the control apparatus 17B detects that the M cassette 23M is accommodated in the bin 13A.

Figure 5:
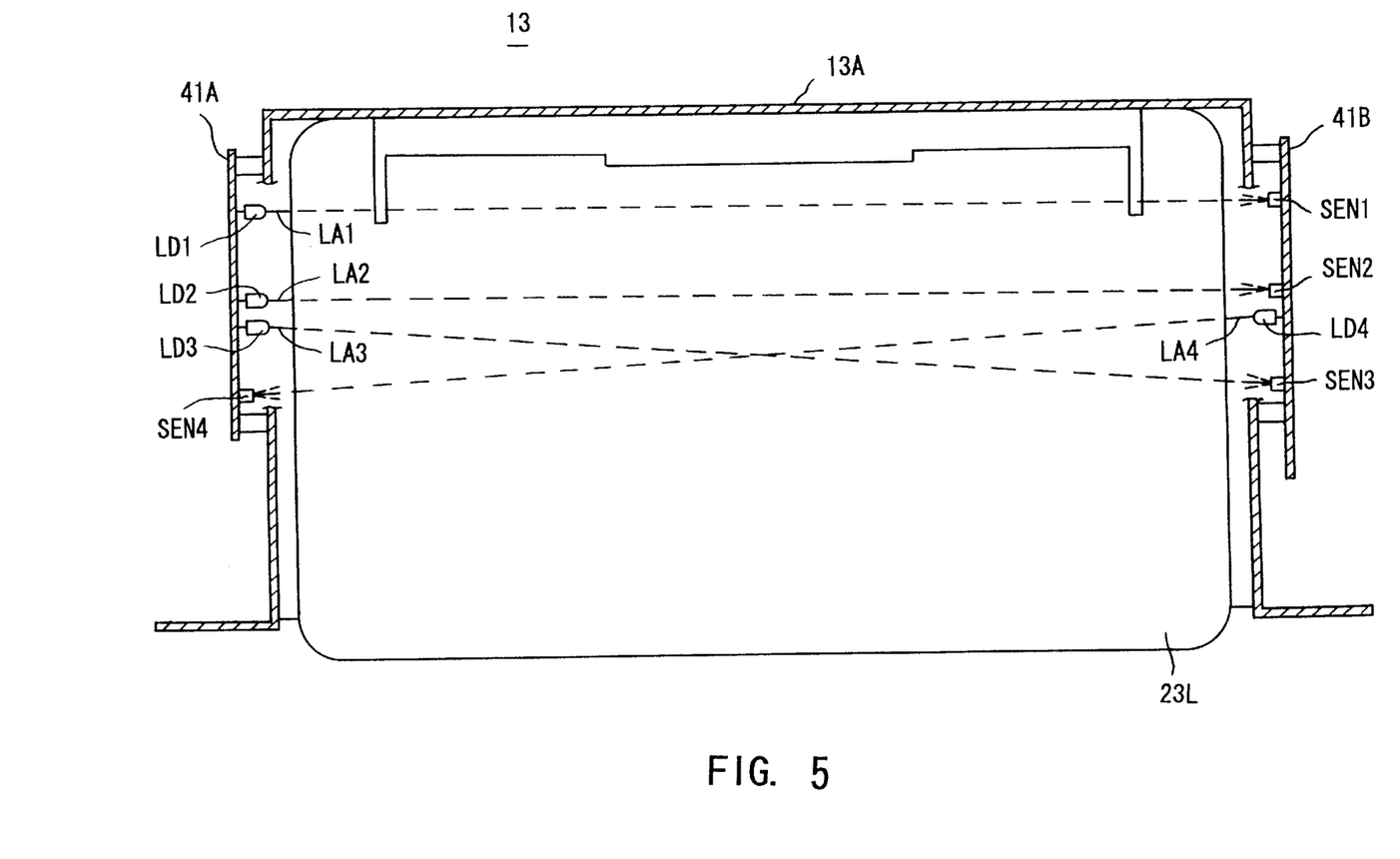
FIG. 5 is a plane view showing detection condition of L cassette by a bin sensor.

When the largest cassette (hereinafter called "L cassette") 23L is accommodated as shown in FIG. 5, all light from the light emitting portions LD1, LD2, LD3, and LD4 are blocked by the accommodated L cassette 23L, and the control apparatus 17B detects that the L cassette 23L is accommodated in the bin 13A.

Similarly, other bins have bin sensors 42 to 48 (FIG. 2) enabling to detect the size of the cassettes accommodated in respective bins by means of bin sensors 41 to 48.

Figure 6:
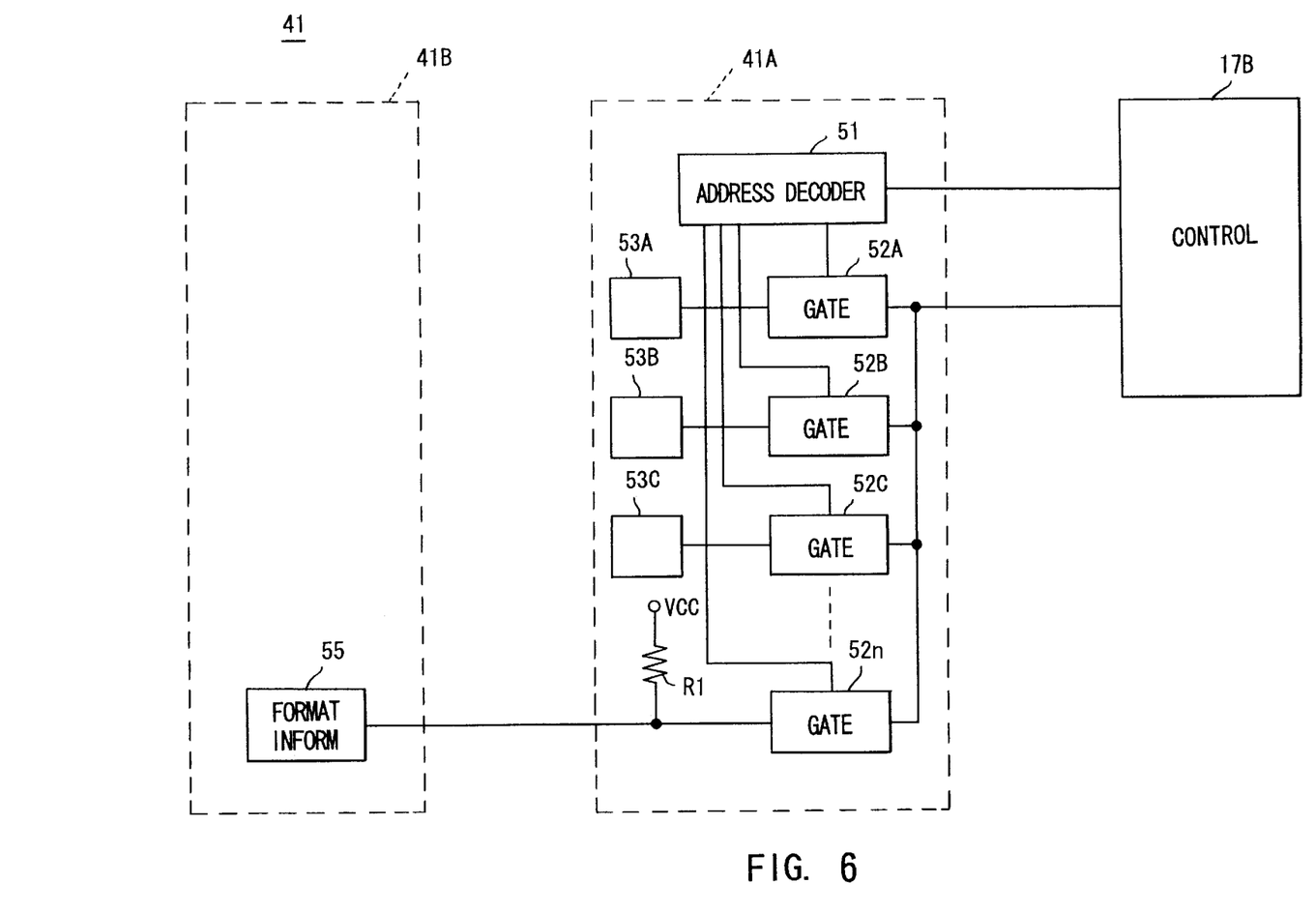
FIG. 6 is a block diagram showing connection configuration of a format information memory portion.

The first detection board 41A which has a bin sensor of respective bins is received control signal from the control apparatus 17B to an address decoder 51 as shown in FIG. 6, in order to open the designated gate out of the gates 52A to 52n according to the control signal.

As a result, information (for example, data of the sensors and position information of the bins) of the information memory portions 53A, 53B, . . . , 53(n-1) connected to respective gates 52A to 52(n-1) are output to the control apparatus 17B. Namely, the accommodating state of the cassette is detected by, for example, the light emitting portions LD1 to LD4 and the light receiving portions SEN1 to SEN4, thus detected result is memorized into the information memory portions 53A, 53B, . . . , 53(n-1) to output it to the control apparatus 17B.

A format information memory portion 55 of the second detection board 41B is connected to the gate 52n through signal line. This format information memory portion 55 is provided at each unit consisting of bins for accommodating the cassettes of the same recording format. The format information memory portion 55 memorizes the kind of recording format of the cassette to be accommodated in the unit containing the format information memory portion 55. The control apparatus 17B is adapted to select the cassette to be accommodated in the bin of the unit having the format information memory portion 55 after the control apparatus 17B detects the format information shown in FIGS. 7A to 7C.

Figure 7A:
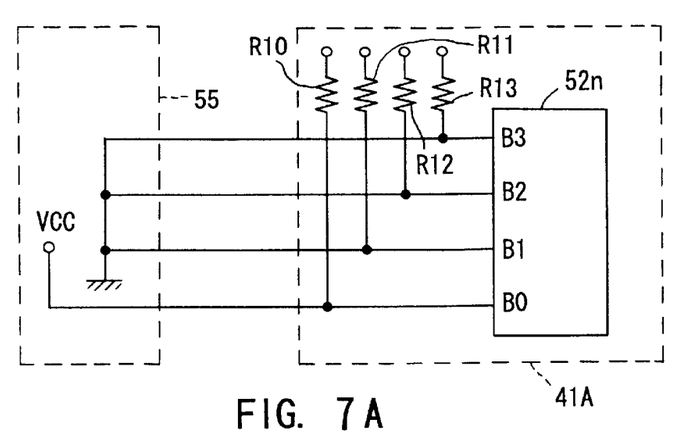
FIGS. 7A to 7C are connection diagrams illustrating configuration of the format information memory portion.

As shown in FIG. 7A, when the first recording format of a format information is supplied, the connection terminals B0 to B3 of the gate 52n are connected to the power source through the resistances R10 to R13, as well as and connection terminal B0 is connected to a power source VCC at the format information memory portion 55 of the detection board 41B. In addition, the connection terminals B1 to B3 are connected to an earth at the format information memory portion 55.

As a result, data obtained from the format memory portion 55 as the first recording format becomes "0001" the data of which is supplied to the connection terminals B3, B2, B1, and B0.

Accordingly, when the format information obtained from the gate 52n is "0001", the control apparatus 17B can judge that the unit having the bin accommodating the detection board 41B having the format information memory portion 55 accommodates the cassette of the first recording format.

Figure 7B:
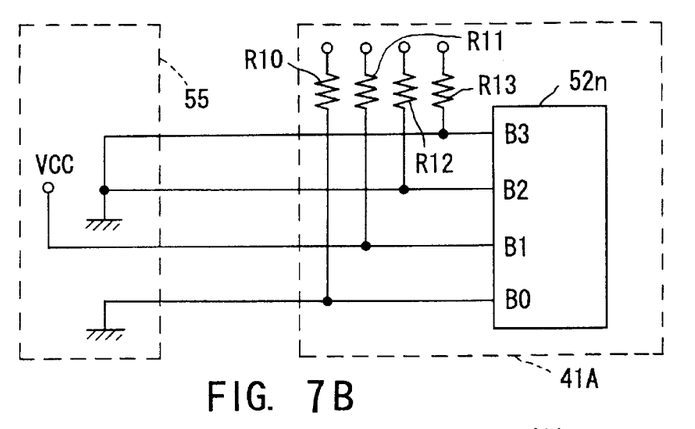

On the contrary, as shown in FIG. 7B, when the second recording format is supplied, the connection terminals B0 to B3 of the gate 52n are respectively connected to the power source through the resistors R10 to R13, as well as the connection terminal B1 is connected to the power source VCC at the format information memory portion 55 of the detection board 41B. In addition, the connection terminals B0, B2, and B3 are connected to the earth at the format information memory portion 55.

As a result, the data obtained from the format memory portion 55 as the second recording format becomes "0010" the data of which is supplied to the connection terminals B3, B2, B1, and B0.

Accordingly, when the format information obtained through the gate 52n is "0010", the control circuit 17B can judge that the unit having the bin on which the detection board 41B having the format information recording portion 55 is mounted accommodates the cassette of the second recording format.

Figure 7C:
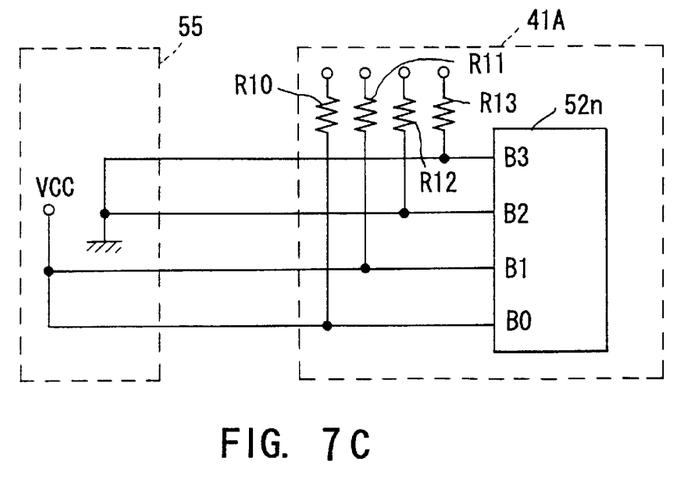

On the contrary, as shown in FIG. 7C, in case that the third recording format is supplied, the connection terminals B0 to B3 of the gate 52n are respectively connected to the power source through the resistances R10 to R13, as well as the connection terminals B0 to B3 are connected to the power source VCC at the format information recording portion 55. In addition, connection terminals B2 and B3 are connected to the earth at the format information memory portion 55.

As a result, the data obtained from the format memory portion 55 as the third recording format becomes "0011" the data of which is supplied to the connection terminals B3, B2, B1, and B0.

Accordingly, when the format information obtained from the gate 52n is "0011", the control apparatus 17B can judge that the unit having the bins on which the detection board 41B having the format information memory portion 55 is mounted accommodates the cassette of the third recording format.

In addition, as shown in FIG. 6, the power source is connected through the resistance R1 to the line between the gate 52n of the detection board 41A and the format memory portion 55 which is provided to the detection board 41B.

Therefore, if the gate 52n of the detection board 41A and the format information memory portion 55 of the detection board 41B are not connected or disconnected, the data to be supplied as the recording format cannot be obtained from the format memory portion 55, and the data which is obtained at the connection terminals of the gate 52n becomes all "1" data, i.e., "1111".

Accordingly, when the format information obtained through the gate 52n is "1111", the control apparatus 17B can judge that the connection condition between the format information memory portion 55 and the gate 52n is caused some trouble.

Figure 8:
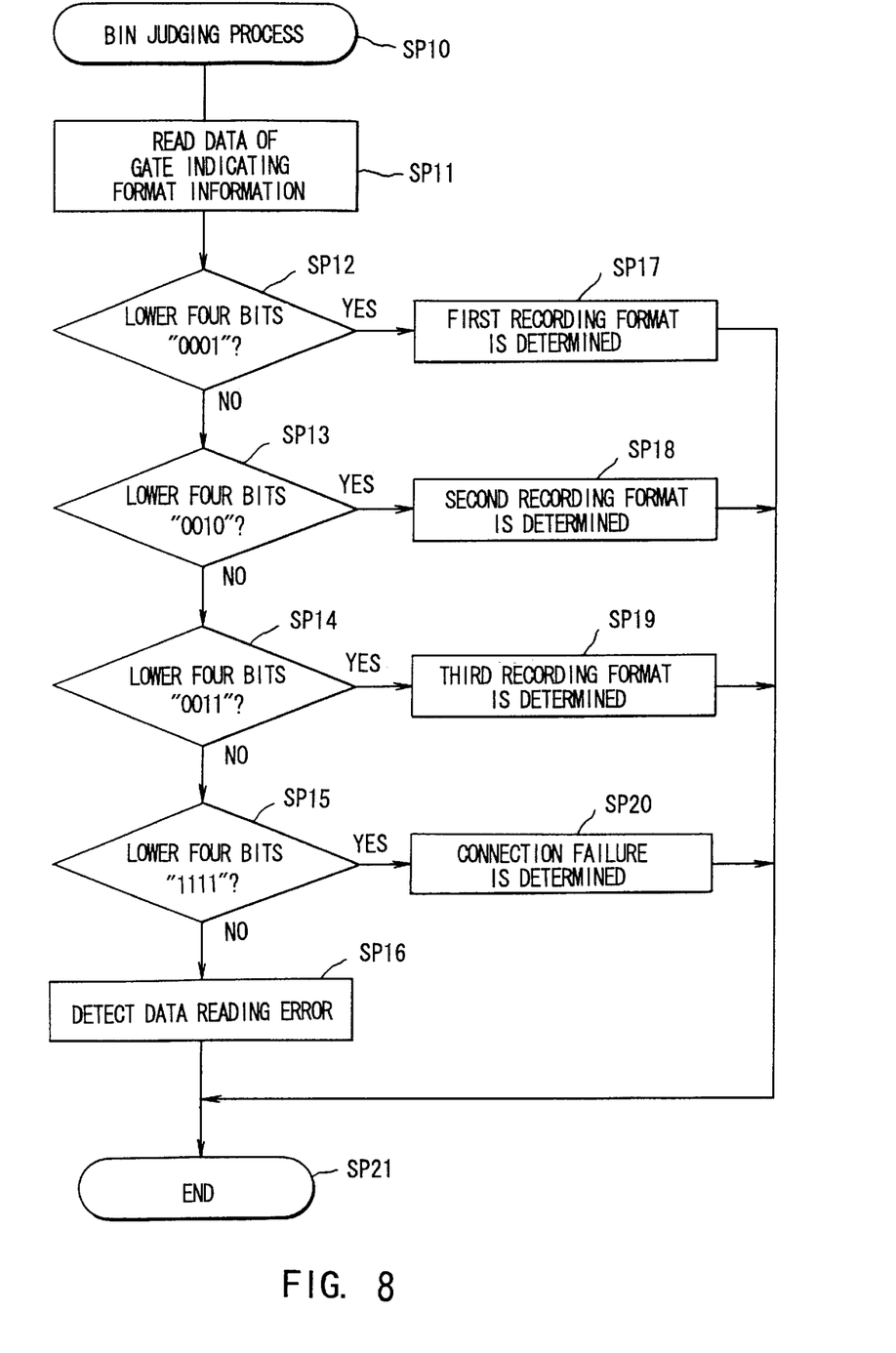
FIG. 8 is a flow chart showing bin judgment processing.

The control apparatus 17B judges the kind of bins on the basis of the recording format of the format information memory portion 55 by executing a bin judging processing shown in FIG. 8. That is, the control apparatus 17B enters the bin judging processing from step SP10 to read data (format information) of the gate 52n connected to the format information memory portion 55 of the bin in step SP11 and judge at the following step SP12 whether the four lower bits of the format information is "0001" or not.

When an affirmative result is obtained at step SP12, the control apparatus 17B determines at step SP17 that the unit having the format information memory portion 55 is one for accommodating the cassette of the first recording format, and then completes the judging processing at step SP21.

On the contrary, when a negative result is obtained at step SP12, the control apparatus 17B proceeds to step SP13 to judge whether the four lower bits of the format information are "0010" or not.

When an affirmative result is obtained, the control apparatus 17B determines at step SP18 that the unit having the format information memory portion 55 is one for accommodating the cassette of the second recording format, and then terminates the judging processing at step SP21.

On the contrary, a negative result is obtained at step SP13, the control apparatus 17B proceeds to step SP14 judging whether the four lower bits of the format information are "0011" or not.

When an affirmative result is obtained at step SP14, the control apparatus 17B determines at step SP19 that the bin having the format information memory portion 55 is one for accommodating the cassette of the third recording format, and then terminates the judging processing at the step SP21.

On the contrary, when a negative result is obtained at step SP14, the control apparatus 17B proceeds to step SPI5 to judge whether the four lower bits of the format information are "1111" or not.

When an affirmative result is obtained at step SP15, the control apparatus 17B determines at step SP20 that the first detection board 41A and the second detection board 41B are failure in connection. Such failure condition is shown on a display 32, and then terminates the judging processing at step SP21.

On the contrary, when a negative result is obtained at step SP15, the control apparatus 17B determines that it is error in data reading at step SP16, and after displaying the data reading error on the display 32, the control apparatus 17B terminates the judging processing at step SP21.

As a result, the control apparatus 17B judges and recognizes the recording format of the cassette to be accommodated in respective units on the basis of the judging processing above and the cassettes corresponding to respective bins are accommodated according to the judging result. Thereby, the various cassettes of different recording formats can be accommodated into the bin of unit corresponding to the particular cassette.

With the configuration described above, the kind of cassette (i.e. recording format) to be accommodated into the bit is discriminated based on the format information of the format information memory portion 55 provided into every unit, so that cassettes with different formats can be certainly accommodated into corresponding bins.

By the way, the format information memory portion 55 is formed on the second detection board 41B, as well as the power source is connected between the format information memory portion 55 and the gate 52n, and then format information in the format information memory portion 55 is read through the first detection board 41A, so that it is possible to simultaneously check a connection condition of the first detection board 41A and second detection board 41B.

Figure 9:
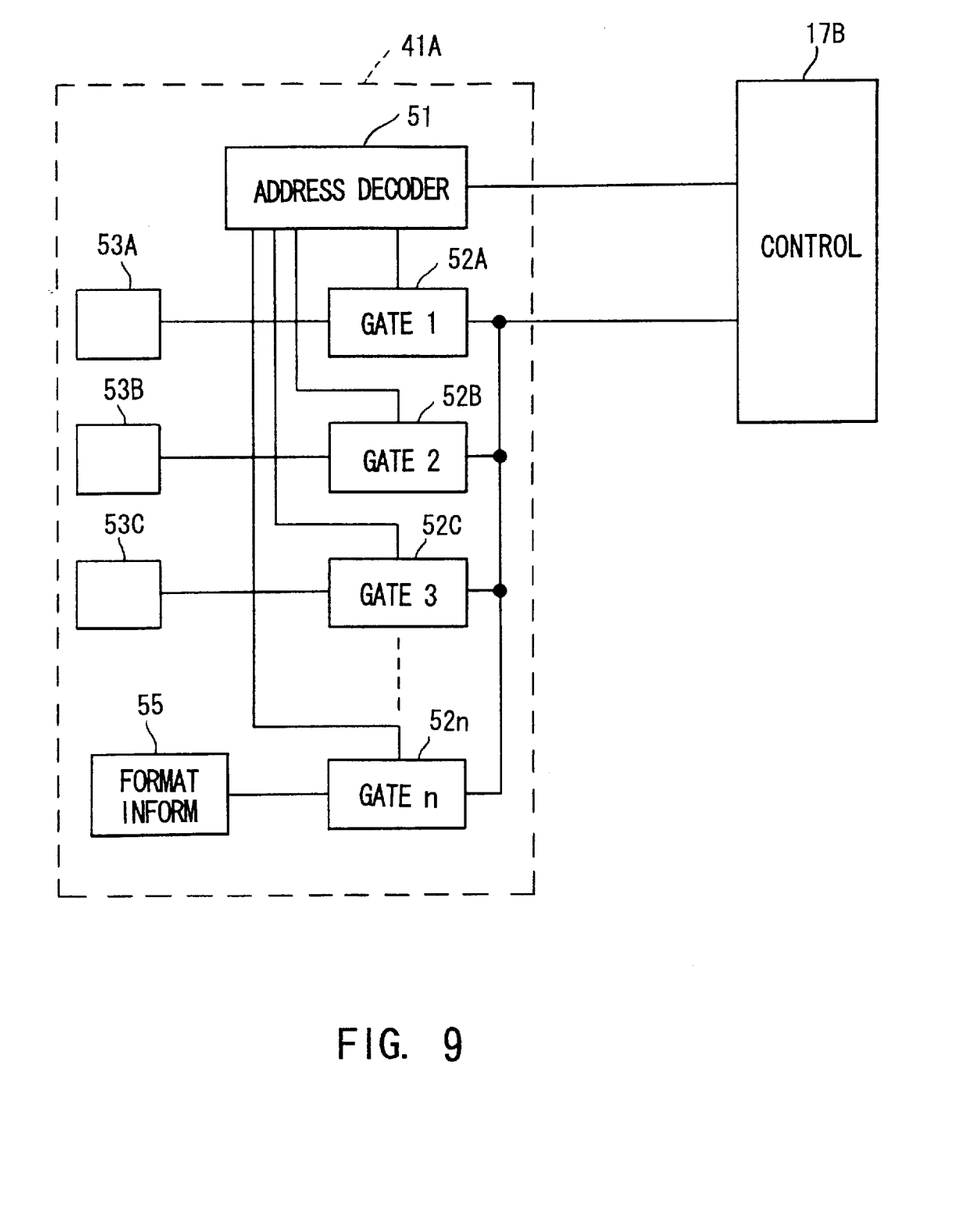
FIG. 9 is a block diagram showing another embodiment.

In the embodiment described above, the second detection board 41B has the format information memory portion 55. However, this invention is not only limited to this, but it is possible to provide the format information memory portion 55 on the first detection board 41A as shown in FIG. 9.

The embodiment above has format information memory portions 55 provided on respective units consisting of plural bins. However, this invention is not only limited to this, but it is possible to provide format information memory portion 55 on each bin.

As described above, according to this invention, the kind of the cassette to be accommodated in the corresponding unit is judged on the basis of cassette judging information of the memory means provided in each unit, so that it is possible to certainly accommodate the cassettes of different kinds to the bin of corresponding unit, as well as the data indicative respective recording formats are provided only changing the connection condition of the detection board (connection condition among the connection terminal of the gate, the power supply, and the earth), thus the data is able to be recognized at the control portion.

Therefore, particular effects are obtained that parts, type detecting board provided every units, and type detecting sensor, or the like, are unnecessary. Further, previous operation for detection of the recording format every accommodating units are unnecessary. Thereby, it can be realized the cassette auto-changer loaded plural kinds of cassettes together with.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A cassette auto-changer, comprising:
   a cassette accommodating portion including a plurality of accommodating units each having a plurality of substantially identical cassette bins, each individual cassette bin being adapted to accommodate a plurality of different types of cassettes housing different types of recording media having different types of recording formats, a respective one of said recording formats being assigned to each of said cassette bins, the cassette bins in a respective accommodating unit accommodating a plurality of cassettes housing recording media having the same one of said recording formats, each of said accommodating units including a memory circuit for storing recording format information indicating the type of recording format assigned to each of said cassette bins therein, said memory circuit including a plurality of connections each connected to one of a power source and a ground;

an information reading circuit electrically coupled to the memory circuit of each of said accommodating units for reading the recording format information from the memory circuits;

a plurality of recording and/or reproducing apparatus each provided for selectively recording and/or reproducing a signal on or from the recording medium housed in the cassette loaded therein in a predetermined one of said recording formats;

a cassette transport mechanism for selectively transporting said cassettes between said cassette bins and said recording and/or reproducing apparatus and for loading the transported cassettes into said cassette bins or said recording and/or reproducing apparatus in accordance with a conveyance command signal; and control means for recognizing the recording format assigned to each of said cassette bins on the basis of the stored recording format information and for generating said conveyance command signal.

2. A cassette auto-changer according to claim 1, wherein said memory circuit comprises a read only memory circuit.

3. A cassette auto-changer according to claim 1, wherein said information reading circuit comprises a plurality of reading circuits each electrically coupled to a respective one of the memory circuits.

4. A cassette auto-changer according to claim 1, further comprising means for supplying a predetermined signal when said memory circuits and said information reading circuit are electrically disconnected.

5. A cassette auto-changer according to claim 1, wherein said control means is operative to supply a read command to said information reading circuit to cause said information reading circuit to read said recording format information from said memory circuits.

6. A cassette auto-changer, comprising:

a cassette accommodating portion including a plurality of accommodating units each having a plurality of substantially identical cassette bins, each individual cassette bin being adapted to accommodate a plurality of different types of cassettes housing different types of recording media having different types of recording formats, a respective one of said recording formats being assigned to each of said cassette bins, each of said cassette bins including a respective memory circuit for storing recording format information indicating the type of recording format assigned to said respective cassette bin, each of said memory circuits including a plurality of connections each connected to one of a power source and a ground;

an information reading circuit electrically coupled to the memory circuit of each of said cassette bins for reading the recording format information from the memory circuits;

a plurality of recording and/or reproducing apparatus each provided for selectively recording and/or reproducing a signal on or from the recording medium housed in a cassette loaded therein in a predetermined one of said recording formats;

a cassette transport mechanism for selectively transporting said cassettes between said cassette bins and said recording and/or reproducing apparatus and for loading the transported cassettes into said cassette bins or said recording and/or reproducing apparatus in accordance with a conveyance command signal; and control means for recognizing the recording format assigned to each of said cassette bins on the basis of the stored recording format information and for generating said conveyance command signal.

7. A cassette auto-changer, comprising:

a cassette accommodating portion having a plurality of cassette bins for accommodating a plurality of different types of cassettes of different sizes housing different types of recording media having different types of recording formats, a respective one of said recording formats being assigned to each of said cassette bins, said cassette accommodating portion including information storing means for storing recording format information indicating the type of recording format assigned to each of said cassette bins, and each one of said cassette bins accommodating a plurality of cassettes having a first size or only one cassette having a second size;

a plurality of recording and/or reproducing apparatus each provided for selectively recording and/or reproducing a signal on or from the recording medium housed in the cassette loaded therein in a predetermined one of said recording formats;

a cassette transport mechanism for selectively transporting said cassettes between said cassette bins and said recording and/or reproducing apparatus and for loading the transported cassettes into said cassette bins or said recording and/or reproducing apparatus in accordance with a conveyance command signal;

means for sensing the size of the cassettes accommodated in each of said cassette bins to produce sensed size information, said sensed size information identifying the number and size of the cassettes accommodated in a respective one of said cassette bins; and control means for recognizing the recording format assigned to each of said cassette bins on the basis of the stored recording format information, for recognizing said sensed size information, and for generating said conveyance command signal.

8. A cassette auto-changer according to claim 7, wherein said means for sensing comprises light emitting means respectively disposed on said cassette bins for generating light beams, and light receiving means respectively disposed on said cassette bins for receiving those of said light beams which are not blocked by the cassettes respectively loaded in said cassette bins.

9. A cassette auto-changer according to claim 7 wherein each of said cassette bins can accommodate one small-sized cassette, two small-sized cassettes, one medium-sized cassette or one large-sized cassettes; and said means for sensing produces sensed size information identifying the number and size of the cassettes accommodated in a respective one of said cassette bins.

10. A cassette auto-changer according to claim 9, wherein each of said cassette bins includes a left side for accommodating one small-sized cassette and a right side for accommodating one small-sized cassette; and said means for sensing produces sensed size information identifying the number, size and location of the cassettes accommodated in a respective one of said cassette bins, said location indicating if a small-sized cassette is accommodated in the right side and if a small-sized cassette is accommodated in the left side.

* * * * *